Sept. 10, 1968    J. L. McCLAREN    3,400,466
METHOD AND APPARATUS FOR CONDITIONING GRAIN
Filed Oct. 13, 1966
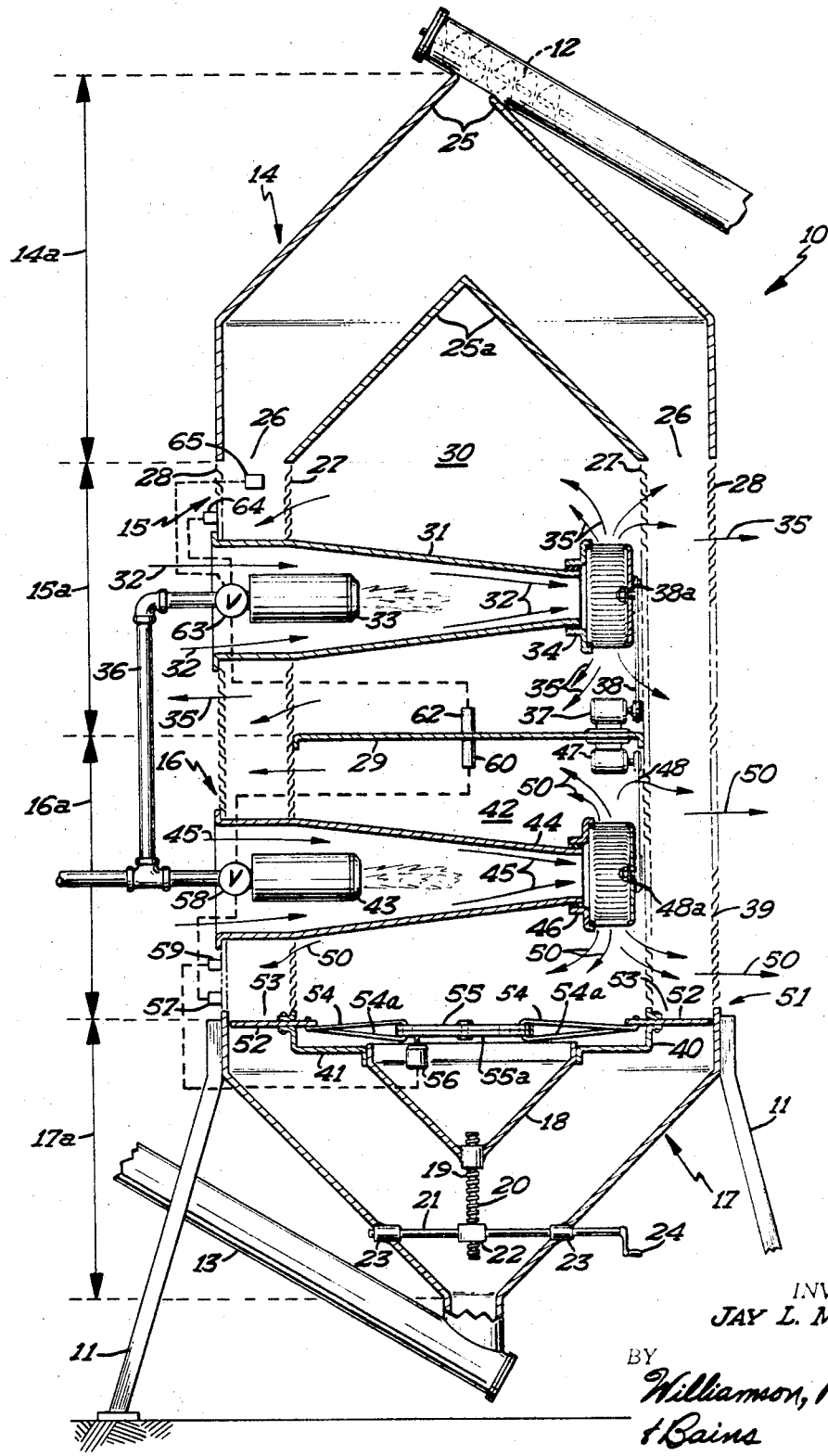
INVENTOR.
JAY L. McCLAREN
BY Williamson, Palmatier
+ Bains    ATTORNEYS

с

United States Patent Office 3,400,466
Patented Sept. 10, 1968

3,400,466
METHOD AND APPARATUS FOR CONDITIONING GRAIN
Jay L. McClaren, Box 366, Garden City, Kans. 67846
Filed Oct. 13, 1966, Ser. No. 586,523
9 Claims. (Cl. 34—25)

ABSTRACT OF THE DISCLOSURE

A grain dryer with interior heated pressurized air plenums, inner and outer perforate walls confining grain and permitting flow of the heated air therethrough, a top surge bin supplying grain between the walls, a gate structure at the lower portion of the walls, and a holding bin below the gate structure from which the dried grain is removed.

---

It is well-known that the optimum period in which harvesting of grain should be conducted is at the time after maturity during which the moisture content of the grain approximates 26%. Not only does harvest at this time minimize the danger of damage to the crop from late season bad weather, but increased yields of up to 20% are oftentimes realized with an attendant increase of profits of sometimes more than 50%. However, most grain species with a moisture content ranging from 25% to 27%, typical of the moistures within grain at the optimum harvest time, cannot be effectively stored. Storage of a grain crop at a higher moisture percentage than recommended will frequently result in mold and subsequent extensive spoilage. Safe maximum moisture content of grains for long term storage of most grain type approximates 12%. Therefore approximately 13 to 15% moisture must be taken from grain which is harvested at the optimum time in order to arrive at optimum moisture percentages for storage.

When grain is sold and has a moisture content greater than a predetermined amount, for example, 16% moisture rather than the optimum 12% moisture, a specific price per bushel is deducted from the high-moisture content grain to arrive at the selling price. On the other hand, for grain which is dried to a percent of moisture considerably less than 12% an adjustment is typically not considered. It is therefore advantageous for the seller of grain to maintain his grain at the highest moisture percent at which it can be stored in order to receive the largest return on his investment.

Presently available continuous flow dryers receive grain which is to be dried generally at the uppermost portion of the continuous flow dryer. Drying is done as the grain continuously flows through the dryer from the uppermost to the lowermost portion. The drying is done generally with air under pressure which is heated to predetermined conditions and which flows from an inner plenum through louvered perforated walls, through the grain and then to the outside. Conditions remain constant from the uppermost to the lowermost bin portions with respect to the air which effects the drying of the grain. The grain at the uppermost portions of the bin contains a high degree of moisture and, since moisture is given up at the uppermost bin portion, the grain temperature does not elevate appreciably, as the grain flows from the uppermost to the lowermost portion of the bin, the air which flows through the grain remains at the same conditions but, since the high percentage of moisture has been removed from the grain at the lowermost portions of the bin the temperature of the grain begins to elevate to correspond to the temperature of the air which flows there through. In the continuous flow dryer, control of the rate of flow will control the moisture of the outgoing grain. However, the flow rate is only changed based on periodic samples which are taken of the outgoing grain. To achieve constant outgoing grain moisture content, the outgoing grain must be regularly checked and the conveyor rate adjusted as necessary. Typically, the burner adjustment is not changed since it is desirable to operate the burner at the maximum permissible temperature at all times, varying the rate of flow of grain through the bin to achieve grain conditions which are desired at the outlet. Because of the problems inherent in the manual control and regular testing when using a continuous flow dryer, wet areas or over dried areas of grain oftentimes result at the outlet. However, drying is relatively fast through the continuous flow unit even though the accuracy of the drying means leaves much to be desired.

In batch drying, the bin holding the batch is filled with grain to be dried, there the air is passed through the grain until it is dried and the bin is then emptied to provide room for a subsequent batch. Of course, a great deal of time which could be utilized in drying grain is taken by the time used to fill the bin and to remove the material from the bin to provide room for the next batch. However, the batch drying method is very accurate and provides grain which is relatively free of wet areas or over dried areas. Further, the batch dryer offers versatility in that cooling of the grain is easily achieved with the batch type dryer. The batch dryer utilizes the incoming and outgoing conveying equipment at peak capacity rather than utilizing conveyors which are operating at a continuously changing capacity as the conveyors which service the continuous flow dryer. Since the rate of flow in the continuous dryer is very dependent upon the moisture of the incoming grain, larger conveyors must service the continuous flow dryer which conveyors are oftentimes operated at considerable less than peak capacity thereby greatly reducing the life of the conveyor. The batch dryer, on the other hand, maximizes the life of the conveyors in that the conveyors operate for a short period of time and under peak capacity.

With these comments in mind it is to the elimination of these and other disadvantages to which the present invention is directed along with the inclusion therein of other novel and desirable features.

An object of my invention is to provide a new and improved method and apparatus of simple and inexpensive operation and construction for conditioning grain in a continuously operating multi-stage batch dryer.

Another object of my invention is the provision of a method and apparatus which automatically discharges properly dried or conditioned grain at a predetermined moisture content with a minimum of direct supervision of the grain conditioning operation.

Still another object of my invention is the provision of a continuously operating multi-stage batch drying unit which accurately, efficiently and quickly dries grain, discharging the dried grain only at such times as predetermined conditions have been reached and thereby discharging a uniform product irrespective of the moisture content of the incoming grain.

A further object of my invention is the provision of a continuously operating multi-stage batch dryer which includes a high degree of control available in conventional batch drying unit with the high capacity available in conventional continuous flow units and which multi-stage unit is capable of drying and cooling of grain as required.

These and other objects of my invention will more fully appear from the description made in connection with the accompanying drawings wherein like reference characters refer to the same or similar parts throughout the several views, and in which:

FIG. 1 is a longitudinal sectional view of the continuously operating multi-stage batch drying apparatus of my invention.

One form of the present invention is shown in the drawings and is described herein.

Referring to FIG. 1, the multi-stage batch dryer of my invention is indicated, in general, by numeral 10 and includes suitable supporting legs 11 which are attached to the bin. The batch dryer is serviced by an inlet conveyor 12 which is of the standard, commercially available screw conveyor type of suitable capacity. Conveyor 12 is driven by a motor which is not shown in the drawing. Conveyor 12 conveys wet grain into the batch dryer 10. Conveyor 12 is typically attached to a receiving hopper which receives wet grain trucked directly from the harvesting area. Any of several receiving methods and related equipment may be used to receive the wet grain from the field and convey the wet grain to the uppermost portion of the multi-stage batch dryer 10. The dried grain is removed from the multi-stage dryer 10 by outlet conveyor 13 which may be of the screw conveyor type of suitable size and capacity. The drive unit for conveyor 13 is not shown. Dryer 10 is cylindrically shaped and comprises four individual communicating compartments. A surge hopper or first wet grain receiving portion is denoted by numeral 14 and includes the vertical portion indicated by the dimension arrow 14a. Bin portion 14 is conical and is defined by the space between inner and outer conical surfaces. A grain conditioning portion or second stage or bin portion is indicated by numeral 15 and the vertical dimension which corresponds to section 15 is denoted by arrow 15a. Bin portion 15 is defined by inner and outer cylindrical walls which are concentric and have a grain containing space therebetween. The grain containing space communicates with bin portion 14. A lower grain conditioning portion or third stage or bin portion 16 communicates with portion 15 and is similarly shaped. Dimension arrow 16a indicates the portion of dryer 10 which includes the third dryer portion or stage 16. A holding bin 17 is positioned at the bottom of dryer 10 and communicates with the third bin portion 16. The portion of the batch dryer 10 which comprises the holding bin 17 is indicated by the dimension line 17a. First portion 14, second portion 15, third portion 16 and the holding hopper or bin 17 are each of substantially equal volumetric capacity. The wall portions 15 and 16 are constructed of suitable louvered steel material. Surge bin 14 may be of a size considerably larger than bins 15, 16 or 17 if desired without affecting the indexing features of the multi-stage unit.

As the wet grain progresses through dryer 10 and is dried, the grain volume decreases as the moisture is removed. Therefore, it is necessary to provide means for controlling the volumetric capacity of holding bin 17 in order to properly index the multi-stage dryer. To this end, a conical baffle 18 is shown and is attached to upright rod 19 which includes a worm gear drive 20 thereon. Transverse rod 21 includes a worm gear 21a which contacts worm gear 20 on upright member 19 at the connection indicated by numeral 22. Rod 21 rotates within bearings 23 and manipulation of handle 24, through the worm gear on shaft 21, actuates worm gear 20 raising and lowering interchangeably volumetric control baffle 18. Therefore, the volume of bin 17 may be changed to correspond to the volume of change the grain undergoes as it is dried. This is particularly important for proper indexing of the grain during drying operation.

Surge bin 14 comprises outer walls 25 and inner walls 25a which are conically shaped and define a grain receiving opening therebetween. Grain flows downwardly from bin 14 into opening 26 which communicates with and permits grain to flow from portion 14 into portion 15. Second dryer portion 15 includes an inner circular louvered wall 27 and a corresponding circular louvered outer wall 28 which surrounds inner wall 27 providing a grain containing volume therebetween equal to the volume of first dryer portion 14. Inner wall 27, transverse plate 29 and surfaces 25a define a plenum chamber 30 inside of bin 15. Burner cone 31 is attached to bin 15 and projects into plenum chamber 30. Burner cone 31 is typically constructed of a suitable steel and refractory material and also serves as a duct for incoming air which is denoted by arrows 32. Burner 33 is mounted in cone 31 to direct the flame toward a fan 34. Air is pulled into fan 34 at the inlet or suction side thereof and is projected radially outwardly as indicated by air flow arrows 35. Fan 34 does not include a scroll but is open at the pressure side thereof around the circumference of the fan. Therefore, heated air under pressure is pulled through the fan and is randomly projected into the plenum chamber 30 and then through the louvered walls as indicated by air flow arrows 35. Burner 33 is serviced by fuel conduit 36. The fuel for burner 33 may be convenient fuel, such as fuel oil or gas. Fan 34 is driven by a motor 37 through a conventional power transmission assembly 38 to a shaft 38a which is connected to fan 34 in any conventional manner. Motor 37 is affixed to plate 29 and is operated by any suitable source of power.

Third dryer portion 16 is similar to second dryer portion 15 and includes a cylindrically shaped outer wall 39 and cylindrically shaped inner wall 40 which are louvered and concentric defining a grain receiving space therebetween. Inner wall 40, transverse plate 29 and transverse plate 41 positioned at the lower end of third dryer portion 16 define plenum chamber 42. It should be noted that the volumetric capacity of third dryer portion 16 is substantially equal to the volumetric capacity of dryer portion 15 which, in turn, is equal to the volumetric capacity of surge bin 14. A burner 43, serviced by fuel line 36 is mounted in burner cone 44 which is securely affixed to bin portion 16 projecting into plenum chamber 42. Incoming air, denoted by arrows 45, is pulled into the suction side of a fan 46 which is driven by motor 47 through a conventional power transmission assembly 48 which is connected to shaft 49 which is connected to fan 46. Motor 47 is connected to a suitable source of power and is mounted on plate 29. Arrows 50 denote the flow of air into plenum chamber 42 and, since fan 46 does not include a scroll, arrows 50 denoted a random air flow pattern which projects air through the inner louvered wall 40 and then through louvered outer wall 39 of dryer portion 16. Air 50, as it flows through the inner and outer walls 40 and 39 respectively, passes through the grain confined within the walls and acts upon the grain which is stationary within the walls. Upon completion of the drying operation in the third dryer portion 16, a gate 51 is automatically opened and the grain in dryer 10 is indexed to succeeding stages from first surge bin 14 to second dryer portion 15, from portion 15 to third portion 16 and from third portion 16 to holding bin 17.

Baffle 18 is adjusted such that when all of the grain which is in third portion 16 is dried its volume is confined within the adjusted volume of bin 17. Therefore, grain which has been partially dried in the second dryer portion 15 progresses into dryer portion 16 for final drying after grain which was formely held in bin 16 advances to bin 17.

Gate 51 is constructed of a plurality of arcuate sections 52 which are adapted to close the opening 53 between bin portions 16 and 17. The arcuate sections 52 are slidably mounted for reciprocating movement in a transverse direction to open or to close opening 53. Upper links 54 and lower links 54a are connected on each side of each of the arcuate sections 52. The arcuate sections overlap and are in sliding contact as they are pulled inwardly by links 54 and 54a. Upper links 54 are attached at one end to an upper circular plate which rotates clockwise in a transverse plane, denoted by numeral 55. Lower links 54a are connected to a lower rotating plate 55a which rotates in a counterclockwise direction parallel with plate 55. Motor 56 drives the rotating plates and is reversible as desired. Each of the arcuate sections 52 are connected to rotating plates 55 and 55a through links 54 and 54a in a similar manner providing a closing or opening similar to the action of a shutter in a camera. A rack and pinion drive arrangement joins the motor drive to the plates and is not shown here. Suitable supporting means for the reciprocating transverse arcuate sections 52 is provided but is not shown in the drawing.

In operation, dryer 10 is first manually filled by the operator with gate 51 closed. Surge bin 14, second dryer portion 15, and third dryer portion 16 are then completely filled with wet grain. Holding bin 17 is empty and is prevented from being filled by the closed gate 51. Next burner 43 is manually ignited and fan 46 is started. Through experience, the operator recognizes the period of time which is necessary to approximately half complete the drying operation within bin 16. At his half-way point, burner 33 is ignited and fan 34 started the initial drying of the wet grain within second bin portion 15 is begun. Of course, the grain within surge bin portion 14 is not affected. During the starting operation, conveyors 12 and 13 are not in operation and thereby conserve on operating costs and decrease the wear experienced in the conveyors.

Temperature sensing device 57 is attached to the outer bin wall of bin 16 and senses the exhaust temperature of air 50 which flows through the grain stored within bin 16. The temperature sensing device 57 is operably connected to burner 43 through a solenoid operated modulating valve 58 and device 57 upon sensing a predetermined high exhaust temperature causes burner 43 to shut down. At this point the cooling step begins and air which is not heated by burner 43 is continuously pushed or urged through the louvered walls by fan 46 which continues to operate even though burner 43 is shut down. When the exhaust temperature in bin 16 reaches a predetermined low point as measured by a temperature sensing device 59, gate 51 is opened in response to sensing device 59 which is operably connected to motor 56 which causes the reciprocating gate sections 52 to slide inwardly thereby clearing opening 53. All of the grain within dryer 10 is then indexed downwardly to the next bin portion. In other words, grain within bin 14 goes to bin 15; grain within bin 15 which has been partially dried proceeds to bin 16 for final drying; and the dried and cooled grain within bin 16 progresses into holding bin 17. After a time delay relay which is operably connected to motor 56 has timed out, the motor reverse and the gate closes; burner 43 is automatically ignited beginning the next sequence. Simultaneously, conveyors 12 and 13 begin to operate to empty bin 17 and fill bin 14 while drying is carried out in bins 15 and 16. From this point in the operation is automatic and proceeds as described above without the need for manually igniting burner 43 which is now automatic. Sensors in the bins may replace the time delay relay for actuating the motor 56 which closes the gate 51.

It should be noted that the drying within the upper bin 15 of the multi-stage dryer is conducted with air at a higher temperature than the air which is used in the lower bin portion 16. However, the temperature of the grain within bin portion 15 is not raised appreciably in that during the initial drying a great deal of moisture is being removed and higher temperature air is tolerated by the grain without harm to the grain.

In the event it is not desired to cool the grain within bin 16, the temperature sensing device for the high exhaust temperature 57 may be operably connected to motor 56 to open gate 51 at a predetermined high point, indexing the grain stored within the dryer in the manner described above. Additional controls within my grain drying apparatus include a plenum air temperature sensing device 60 which is operably connected to modulating valve 58 for control of the air temperature within bin portion 16 within a predetermined range. A plenum air temperature sensing device 62 is included within bin 15 to measure the air temperature within the plenum and is connected to a modulating valve 63 which is responsive to temperature sensing device 62 thereby providing air in the plenum chamber 30 within a predetermined range. An exhaust temperature sensing device 64 is attached to bin 15 on the outside surface thereof to measure the air exhaust temperature and is operably connected to modulating valve 63 whereby valve 63 is responsive to sensing device 64 thereby maintaining the exhaust temperature within a predetermined range. Further, a safety feature is built into this sensing device in that failure of the conveyors to deliver grain to be dried results in an extremely high exhaust temperature sensed by device 64 which causes burner 33 through modulating valve 63 which is responsive to sensing device 64 to shut down. Additionally a grain temperature sensing device 65 positioned in contact with grain in bin 15 is operably connected to modulatng valve 63 which is responsive to the grain temperature sensing device such that the grain being dried does not reach temperature higher than a predetermined setting at which grain may be harmed.

From the foregoing it will be seen that I have provided a method and apparatus for conditioning grain which is versatile, accurate, fast and safe. My grain conditioning method and apparatus combines the most desirable features of batch drying and continuous flow drying into a continuously operating multi-stage batch dryer without introducing undesirable features of either system. Further, my method and apparatus for conditioning grain requires a minimum of material handling equipment to service the conditioning apparatus and a minimum of supervision during the conditioning operation.

The apparatus of my invention is flexible in that the grain may be cooled within an alternate storage bin or may be cooled in my apparatus during the time grain is being dried in another stage within the same bin. The grain which is discharged is properly and uniformly conditioned to the predetermined conditions desired by the operator. Further, the operator may confidently charge the drying apparatus of my invention with grain quantities of highly varying moisture without constantly checking the product which discharged from the bin. Automatic controls within my continuously operating multi-stage batch dryer compensates for changes in moisture of incoming grain and provide a uniformly dried or conditioned product at the outlet of my multi-stage drying unit.

It will, of course, be understood that various changes may be made in the form, details, arrangement and proportions of the various parts without departing from the scope of my invention.

What is claimed is:

1. A method for conditioning grain, said method comprising the steps of conveying grain to be conditioned into a multi-stage continuously operating batch dryer the dryer including surge bin, a grain conditioning portion having upright inner and outer walls with openings therein and disposed below the surge bin whereby grain stored within the surge bin may progress from the surge bin into the grain conditioning portion and a holding bin positioned below the grain conditioning portion whereby grain stored within the grain conditioning portion may progress from the grain conditioning portion into the holding bin, the holding bin having a volumetric capacity substantially equal to the volumetric capacity of the grain conditioning portion, heating air adapted to contact the grain stored in the grain conditioning portion, directing the heated air through the openings in the inner and outer walls of the grain conditioning portion whereby grain stored therein is conditioned by the flow of air therethrough, sensing the condition of the grain stored in the grain conditioning portion, and indexing grain from the grain conditioning portion into the holding bin and from the surge bin into the grain conditioning portion in response to predetermined conditions sensed in the sensing step.

2. The method of claim 1 including the step of conveying conditioned grain from the holding bin simultaneously with the step of directing air through grain indexed from the surge bin and stored in the grain conditioning portion.

3. The method of claim 1 including the steps of
indexing grain from the grain conditioning portion into a lower grain conditioning portion positioned below the grain conditioning portion whereby grain stored in the grain conditioning portion may progress therefrom into the lower grain conditioning portion, the lower grain conditioning portion having a volumetric capacity substantially equal to the volumetric capacity of the grain conditioning portion and having upright inner and outer walls with openings therein,
heating air adapted to contact the grain stored in the lower grain conditioning portion,
circulating heated air through the openings in the inner and outer walls of the lower grain conditioning portion whereby grain stored therein is conditioned by the flow of heated air therethrough,
sensing the conditions of the grain stored in the lower grain conditioning portion,
shutting down the flow of heated air directed through the walls of the lower grain conditioning portion in response to a predetermined condition of the grain stored in the lower grain conditioning portion sensed in the sensing step,
circulating ambient air through the grain in the lower grain conditioning portion simultaneous with the conditioning of grain in the grain conditioning portion and
indexing grain from the grain conditioning portion into the lower grain conditioning portion, from the lower grain conditioning portion into the holding bin and from the surge bin into the grain conditioning portion in response to predetermined conditions of grain in the lower grain conditioning portion sensed in the sensing step.

4. A multi-stage continuously operating batch dryer adapted to condition grain, said dryer comprising
inlet conveying means adapted to convey grain to be conditioned into the dryer at the uppermost portion thereof,
outlet conveying means adapted to convey conditioned grain from the dryer at the lowermost portion thereof,
a surge bin adapted to receive the grain from said inlet conveying means,
a grain conditioning portion disposed below said surge bin and communicating therewith whereby grain strored within said surge bin progresses from said surge bin into said grain conditioning portion, said grain conditioning portion having generally upright inner and outer walls defining a grain containing space therebetween the walls having openings therein to permit air to flow therethrough, the inner wall substantially surrounding and defining a plenum chamber,
heater means affixed to said dryer,
fan means affixed to said dryer and having fan drive means operably connected to said fan means, said fan means adapted to interchangeably receive ambient air and air heated by said heater means and discharge air under pressure into the plenum chamber whereby the air flows through the inner wall openings, through the grain adapted to be stored between the inner and outer walls and through the outer wall openings thereby conditioning grain in said grain conditioning portion,
a holding bin positioned below said grain conditioning portion and having a volumetric capacity substantially equal to the volumetric capacity of said grain conditioning portion, said holding bin communicating with said grain conditioning portion whereby grain stored in said grain conditioning portion may progress into said holding bin,
gate means interposed between said grain conditioning portion and said holding bin portion, said gate means adapted to be interchangeably positioned to provide for progression of grain from said grain conditioning portion to said holding bin and to restrict progression of grain from said grain conditioning portion to said holding bin, and
sensing means affixed to said grain conditioning portion to permit sensing of conditions of grain stored therein, said sensing means operably connected to said gate means whereby said gate means is opened for a predetermined time at a predetermined setting of said sensing means to permit indexing of grain in said grain conditioning portion into said holding bin thereby permitting grain from said surge bin to progress into said grain conditioning portion.

5. The apparatus of claim 4 including,
at least one lower grain conditioning portion interposed between said grain conditioning portion and said holding bin, said lower conditioning portion having generally upright inner and outer walls defining a grain containing space therebetween, the grain containing space corresponding to and communicating with the grain containing space in said grain conditioning portion and the grain containing space in said holding bin whereby grain may progress from said grain conditioning portion into said lower grain conditionng portion and from said lower grain conditioning portion into said holding bin, the upright walls having openings therein to permit air to flow therethrough, the inner wall substantially surrounding and defining a plenum chamber,
heater means affixed to said dryer, and
fan means affixed to said dryer and having fan drive means operably connected to said fan means, said fan means adapted to interchangeably receive ambient air and air heated by said heater means into the plenum chamber of said lower grain conditioning portion and discharge air under pressure into the plenum chamber whereby the air flows through the inner wall openings, through the grain adapted to be stored between the inner and outer walls and through the outer wall openings thereby conditioning grain in said lower grain conditioning portion.

6. The apparatus of claim 4 wherein said holding bin includes a volumetric control baffle adjustably mounted therein whereby manipulation of the baffle adjusts the volume of said holding bin to substantially correspond to the volume of conditioned grain in said grain conditioning portion.

7. The apparatus of claim 4 including sensing means operably connected to said heater means, said sensing means adapted to sense conditions of grain being conditioned in said grain conditioning portion whereby the heater is shut down at a predetermined setting of said sensing means thereby allowing grain being conditioned in said conditioning portion to be cooled as ambient air under pressure flows through the walls surrounding said grain conditioning portion.

8. The apparatus of claim 5 including sensing means affixed to said lower grain conditioning portion and operably connected to the lower grain conditionng porton heater adapted to permit sensing of conditions of grain being conditioned in said lower grain conditioning portion whereby said heater means is shut down at a predetermined setting of said sensing means thereby allowing ambient air under pressure to flow through the inner and outer walls defining said lower grain conditioning portion thereby cooling the grain stored therein simultaneous with the conditioning of grain in the grain conditioning portion.

9. The apparatus of claim 4 including sensing means positioned in the plenum chamber of said grain conditioning portion and operably connected to said heater means whereby the air in the plenum chamber is maintained within a predetermined temperautre range set at said sensing means.

References Cited

UNITED STATES PATENTS

| | | | |
|---|---|---|---|
| 1,459,326 | 6/1923 | Dow | 34—56 XR |
| 3,274,699 | 9/1966 | Maylor | 34—174 XR |

FREDERICK L. MATTESON, Jr., *Primary Examiner.*

A. D. HERRMANN, *Assistant Examiner.*